(No Model.)
C. B. HÜHNERMANN.
PIPE COUPLING.
No. 437,845. Patented Oct. 7, 1890.
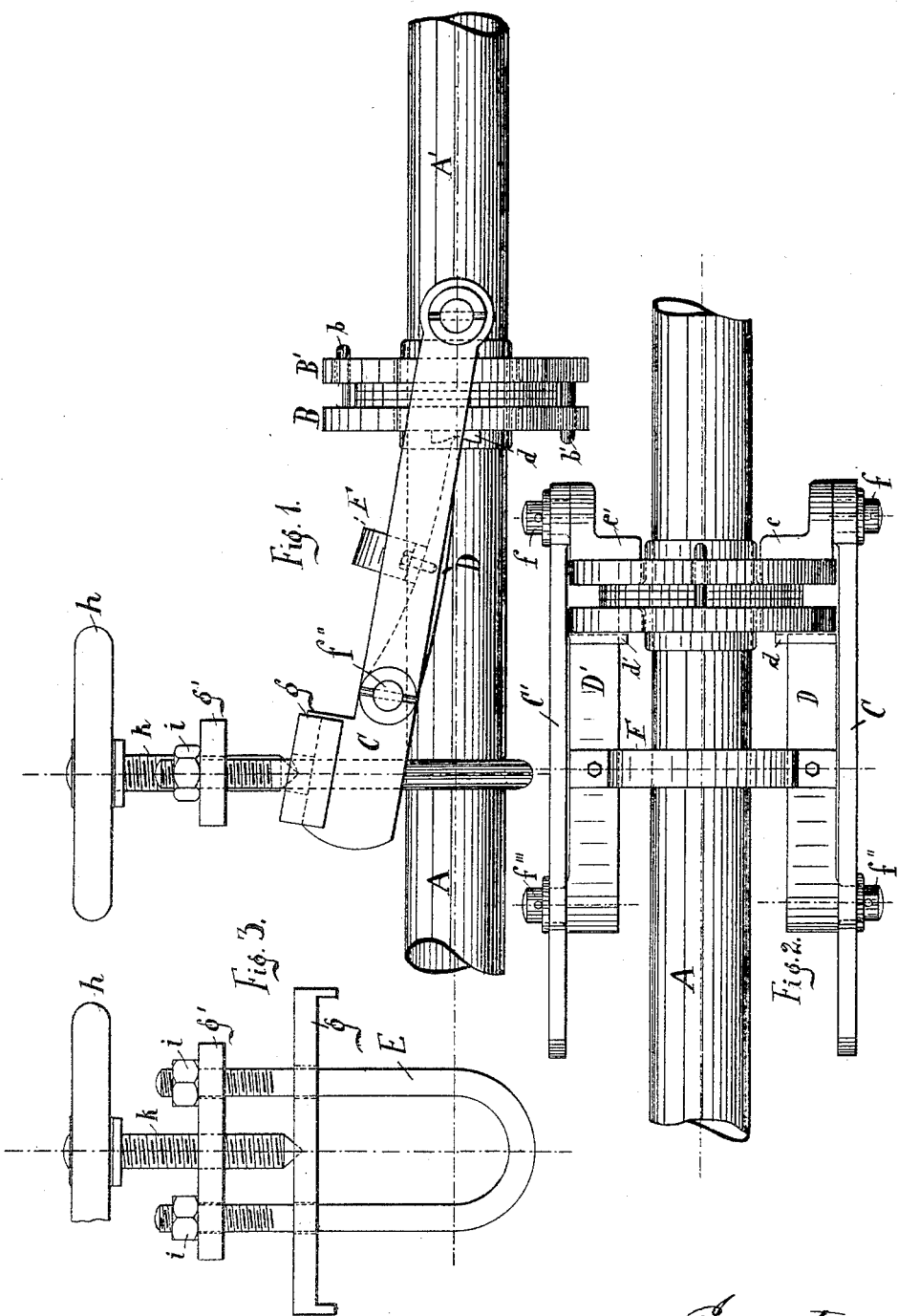
Witnesses:
A. Jonghmans.
W. H. Lowe.
Inventor:
C. B. Hühnermann
by his attorneys
Roeder & Briesen

UNITED STATES PATENT OFFICE.

CHRISTOPH BERTHOLD HÜHNERMANN, OF WACKERSLEBEN, GERMANY.

PIPE-COUPLING.

SPECIFICATION forming part of Letters Patent No. 437,845, dated October 7, 1890.

Application filed July 14, 1890. Serial No. 358,697. (No model.)

*To all whom it may concern:*

Be it known that I, CHRISTOPH BERTHOLD HÜHNERMANN, a subject of the King of Prussia, residing at Wackersleben, in the Kingdom of Prussia, German Empire, have invented new and useful Improvements in Pipe-Couplings, of which the following is a specification.

This invention relates to a pipe-coupling which may be quickly coupled up and uncoupled, and is especially designed for use in awkward positions.

Reference is to be had to the accompanying drawings, forming part of this specification, wherein—

Figure 1 shows a side elevation of the coupling almost but not quite tightened up. Fig. 2 is a plan of same, the screw-gear for operating the coupling being omitted, and shown in Fig. 3 in front elevation.

A A' are two tubes to be coupled together.

B B' are loose collars serving to carry the tightening mechanism and to transmit the pressure uniformly to the flanges of the pipe-ends to be coupled. The collars are guided by steady-pins $b\ b'$, and the collar B' has brackets $e\ e'$, carrying gudgeons $f\ f'$, upon which are pivoted the tension links or levers C C'. To these links C C' are pivoted by their gudgeons $f''\ f'''$ the thrust-links D D', which are coupled by a cross-bar F, and whose other ends engage V-notched blocks $d\ d'$ on the other collar B. The two pair of tension and thrust members C C' and D D' form a sort of toggle whereby the collars B B' are pressed toward each other when the centers $f''\ f'''$, $d\ d'$, and $ff'$ are brought in the plane of the pipe. This is done by means of the gear shown in Fig. 3, consisting of a stirrup E, embracing the pipe and resisting the thrust of a pressure-screw $k$, turned by a wheel $h$, and screwing through a cross-bar $g'$, supported by nuts $i$ and bearing against a pressure-bar $g$, sliding on the stirrup and bearing against the levers C C', whereby the latter are brought toward the line of the pipe. The collars B B' are drawn together, and the flanges of the pipes A A' are firmly pressed against the intermediate packing, thus making an absolutely tight joint.

The essential advantages of this coupling are the rapidity with which it can be coupled up and uncoupled, and its availability in localities where there is no room for screwing up in the ordinary way.

For specific purposes the screw $k$ is lengthened to permit of the coupling being operated from outside the chamber within which it is situated when, for instance, the latter contains noxious gases or is unapproachable on any other account. For instance, in case of fire it may be readily uncoupled from an adjoining apartment and allow the escape of steam or gases to extinguish the fire.

What I claim is—

1. The combination, in a pipe-coupling, of a pair of collars B B', with levers C C', pivotally connected to collar B', and with levers D D', pivoted to levers C C' and bearing against collar B, substantially as specified.

2. The combination of a pair of collars with toggle-levers C C' D D', connected to one collar and bearing against the other collar, and with stirrup E, cross-bar $g'$, pressure-bar $g$, and screw $k$, for operating the toggle-levers, substantially as specified.

In testimony whereof I have signed my name to this specification in the presence of two subscribing witnesses.

CHRISTOPH BERTHOLD HÜHNERMANN.

Witnesses:
W. EGGELING,
TH. BREHMRATH.